(12) United States Patent
Otte et al.

(10) Patent No.: US 7,506,095 B2
(45) Date of Patent: Mar. 17, 2009

(54) SYSTEM AND METHOD FOR PROVIDING EXECUTE-IN-PLACE FUNCTIONALITY

(75) Inventors: Carsten Otte, Boeblingen (DE); Ulrich Weigand, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 11/397,843

(22) Filed: Apr. 4, 2006

(65) Prior Publication Data

US 2008/0127221 A1    May 29, 2008

(51) Int. Cl.
*G06F 12/00*   (2006.01)
*G06F 3/00*    (2006.01)

(52) U.S. Cl. .......................................... 711/6; 719/321
(58) Field of Classification Search ............. 711/6; 719/321
See application file for complete search history.

(56) References Cited

U.S. PATENT DOCUMENTS

| | | | |
|---|---|---|---|
| 2002/0034105 A1* | 3/2002 | Kulkarni et al. | 365/200 |
| 2002/0069342 A1* | 6/2002 | Ginsberg | 711/209 |
| 2006/0129794 A1* | 6/2006 | Rudelic | 713/2 |

* cited by examiner

*Primary Examiner*—Reginald G. Bragdon
*Assistant Examiner*—Mehdi Namazi
(74) *Attorney, Agent, or Firm*—Matthew W. Baca; Marilyn S. Dawkins

(57) ABSTRACT

A method for providing execute-in-place functionality in a data processing system. In one embodiment, the method includes determining whether a file system driver that manages a file system containing a file provides a file system direct-access interface. Execute-in-place functionality is used in response to determining both that the file system driver provides the file system direct-access interface and that a device driver provides a device direct-access interface. The file system direct-access interface is used to provide the execute-in-place functionality in response to determining that the file system is configured to enable execute-in-place functionality.

2 Claims, 18 Drawing Sheets

SYSTEM AND METHOD FOR PROVIDING EXECUTE-IN-PLACE FUNCTIONALITY

FIELD OF THE INVENTION

The present invention relates in general to operating systems, and in particular to operating systems which provide a system and method for implementing the execute-in-place functionality.

BACKGROUND OF THE INVENTION

Prior art computer systems contain non-volatile mass storage devices (e.g. hard disk drives) to hold program and data files. The contents of these files must be loaded into a RAM ("Random Access Memory") type system memory in order to be accessed or executed by the CPU ("Central Processing Unit"). This operation is typically performed by an operating system on behalf of application programs. Prior art computer systems and operating systems support virtual memory and demand paging. Applications do not directly use system memory addresses to designate the code and data they use; instead they use "virtual addresses" to designate memory locations, which are translated into system memory addresses by a paging mechanism implemented by CPU circuits and controlled by the operating system. This allows the operating system to avoid having to load program and data files in their entirety into RAM. Instead, system memory is divided into chunks of a particular size (called "pages"), and the operating system loads the corresponding chunk of the file contents into each memory page only at the time this specific page is accessed. This process is usually called "demand paging".

One disadvantage of this method is that RAM is required to hold the contents of programs and data files, reducing the amount of RAM available for other purposes. Also, it typically requires some time to download the contents into RAM. Some prior art computer systems therefore provide a different type of nonvolatile storage devices that can be accessed directly by the CPU in the same manner as RAM ("memory-addressed devices"). One prior art embodiment of a memory-addressed device is a flash memory card. A memory-addressed device allows the CPU to execute code and access data stored on it without first downloading the contents into RAM. This method of directly executing code residing on a memory-addressed device is referred to as "execute-in-place". In order to provide execute-in-place functionality to applications running on an operating system supporting virtual memory, the operating system has to control the paging mechanism such that certain virtual addresses of an application's address space are mapped to system memory addresses within the range of addresses supported by the memory-addressed device.

Other prior art computer systems provide virtualization capabilities. Virtualization is implemented by a software program, often referred to as "hypervisor" that runs on a single computer system, but allows multiple "guest" operating systems to run concurrently, each in a separate "virtual machine". Each virtual machine appears to the operating system running within as if it were itself a real computer system, complete with CPU, RAM, and I/O devices. Accesses to these virtual components are intercepted by the hypervisor and translated into accesses to real components. This allows the resources of the computer system to be shared between multiple guest operating systems, providing for increased total utilization of the system resources.

One disadvantage of some prior art virtualized computer systems is that if the same program or data is concurrently accessed by multiple guests running under the same hypervisor, each guest operating system will separately allocate virtual RAM to hold those contents, and the hypervisor may thus have to allocate multiple identical copies of said contents in physical RAM. This means that less memory is available for other purposes, which limits the number of guests that are able to run efficiently simultaneously. Therefore, some prior art hypervisors provide segments of physical memory that can be accessed simultaneously from multiple guests ("shared memory segments"). By storing program or data files into a shared memory segment, multiple guests can access said files simultaneously without first downloading the contents into virtual RAM. Said shared segments appear to the guest operating system as if there were physical memory-addressed devices.

Data and program files are typically stored on devices using a standard file system layout; some operating systems are able to use multiple different file system layouts optimized for different usage scenarios. To enable this, prior art operating systems are typically structured into multiple components. In some operating systems, there is a central file and memory management component, a plurality of file system drivers and a plurality of I/O device drivers. Thus the operating system allows to use any of the supported file system layout on any of the supported I/O devices, by using the appropriate pair of file system driver and I/O device driver in combination with the central file and memory management component. However, prior art operating systems cannot use existing file system drivers to access memory-addressed devices in a fashion that allows for execution in place. Execute-in-place support accessing memory-addressed devices is implemented in a monolithic fashion.

In fact, some prior art operating system implementations do not allow a standard file system layout to be used to store data on memory-addressed devices at all; instead, they require data on such devices to be arranged in ways specific to the device. This arrangement may have multiple disadvantages, in particular for computer systems using both I/O devices and memory-addressed devices. Supporting different file system layouts can make system administration more difficult. Different tools may be required to format, manage, back up and restore different layouts. It may be more difficult to migrate an existing set of files from an I/O device to a memory-addressed device or vice versa. The specific layout required by the memory-addressed device may not provide all features (e.g. to implement sophisticated access control and privilege checks) that are present with standard file system layouts.

Another prior art implementation (the XIP2FS file system for Linux on zSeries) provides support for storing programs and data onto a virtual memory-addressed device (shared memory segments provided by the z/VM hypervisor) using the Second Extended File System ("ext2") format, one of the standard file system formats provided by the Linux operating system. However, this method still has most of disadvantages described in the previous paragraph: none of the other standard Linux file system formats can be used, and in addition XIP2FS does not provide all features of ext2 (e.g. XIP2FS does not support write access).

Another disadvantage of XIP2FS is that it is not integrated into the above-mentioned component structure of the operating system; even though XIP2FS accesses files using the ext2 file system layout, XIP2FS does not use the Linux ext2 file system driver to do so, but instead re-implements the access logic required to access the ext2 file system layout. This again causes XIP2FS to not support all features of ext2, as only a subset of the full ext2 logic is re-implemented. As further disadvantage, the standard ext2 file system component of the Linux operating system is being developed over time and new features are added; for example the version of the ext2 file system driver provided with Linux kernel version 2.6 added support for faster accesses to very large directory structures as well as more sophisticated access control mechanisms. XIP2FS does not benefit automatically from such enhancements to the ext2 driver; all required features need to be re-implemented within XIP2FS code.

OBJECT OF THE PRESENT INVENTION

It is object of the present invention to provide a method of providing execute-in-place functionality by an operating system avoiding the disadvantages of the prior art as described above.

BRIEF SUMMARY OF THE PRESENT INVENTION

The present invention discloses an operating system which provides a new system and method for implementing the execute-in-place functionality.

The prior art operating system on which the present invention is based comprises a memory/file Manager having an interface to an application program, at least one file system driver having a file system I/O interface to a memory/file manager, at least one device driver having a device I/O interface to the file system driver, wherein said at least one device driver provides access to at least one I/O based device, at least one device driver having a device I/O interface to the file system driver, wherein said at least one device driver provides access to at least one memory-addressed device, wherein said operating system provides an execute-in-place functionality to access at least one memory-addressed device.

The prior art operating system is extended by the following new and inventive function components for implementing the execute-in-place functionality:

a file system direct-access interface between the memory/file manager and the at least one file system driver, wherein the file system direct-access interface provides the functionality to retrieve the system memory address of the contents of a specified file at a specified offset, where the file resides on said memory-addressed device, a device direct-access interface between the at least one file system driver and the at least one device driver providing access to said at least one memory-addressed device, wherein the device direct-access interface provides the functionality to retrieve the system memory address of a specified block of at least one memory-addressed device, wherein the execute-in-place functionality is provided by the memory/file manager, the at least one file system driver, and the at least one device driver providing access to the at least one memory-addressed device by using the file system direct-access interface and the device direct-access interface.

BRIEF DESCRIPTION OF THE SEVERAL VIEWS OF THE DRAWINGS

The above, as well as additional objectives, features and advantages of the present invention will be apparent in the following detailed written description.

The novel features of the invention are set forth in the appended claims. The invention itself, however, as well as a preferred mode of use, further objectives, and advantages thereof, will be best understood by reference to the following detailed description of an illustrative embodiment when read in conjunction with the accompanying drawings, wherein:

FIG. 1A shows a block diagram of computer system 10. Computer system 10 can be a personal computer, a mainframe computer, or any other type of computer or data processing system; computer system 10 can also be a virtual machine provided by a hypervisor running on another computer system, as described later. Computer system 10 includes a central processing unit ("CPU") 11, random-access memory ("RAM") 12, a memory-addressed device 13, and an I/O-based device 14. In one embodiment, memory-addressed device 13 can be a flash memory card. In other embodiments, memory-addressed device 13 can be any device that can be directly accessed by CPU 11 for memory operations. In one embodiment, I/O-based device 14 can be a hard disk drive. In other embodiments, I/O-based device 14 can be any device that allows data to be copied to and from RAM 12 using I/O operations. Computer system 10 may also include multiple instances of memory-addressed device 13 and/or I/O-based device 14. CPU 11, RAM 12, and devices 13 and 14 are coupled to a system bus 15. CPU 11 can directly access RAM 12 and memory-addressed device 13 for memory operations. I/O-based device 14 cannot be accessed directly by CPU 11 for memory operations, however data can be copied from device 14 to RAM 12 and vice versa using I/O operations. Computer system 10 runs an operating system (discussed in more detail later) that allows running one or more application programs; the operating system manages and regulates access by application programs to the various resources (CPU 11, RAM 12, devices 13 and 14) of computer system 10.

In some embodiments, computer system 10 can be a virtual machine emulated by a hypervisor running on another computer system. FIG. 1B depicts such an embodiment, where computer system 10 consists of a virtual CPU 11, virtual RAM 12, and virtual devices 13 and 14. All virtual components are provided by hypervisor 21, which is a software program running on another computer system 20, itself consisting of CPU, RAM, and devices. The hypervisor 21 provides virtual components 10-14 either completely in software, or by employing virtualization hardware assist functions provided by computer system 20. In addition to virtual machine 10, other virtual machines 22 may run concurrently under hypervisor 21 on computer system 20. In one embodiment, hypervisor 21 can be the z/VM software program manufactured and sold by IBM Corp., running on an IBM eServer zSeries mainframe computer. In this embodiment, computer system 10 can be a virtual machine provided by z/VM, and memory-addressed device 13 can be a Discontiguous Saved Segment ("DCSS") defined under z/VM and made available to the virtual machine. A DCSS is a segment of memory managed by z/VM that can be made available to one or multiple virtual machines at the same time; z/VM always holds only a single copy of the DCSS contents in real RAM of computer system 20, even if the DCSS is made available to multiple virtual machines at the same time.

Figure 1A:
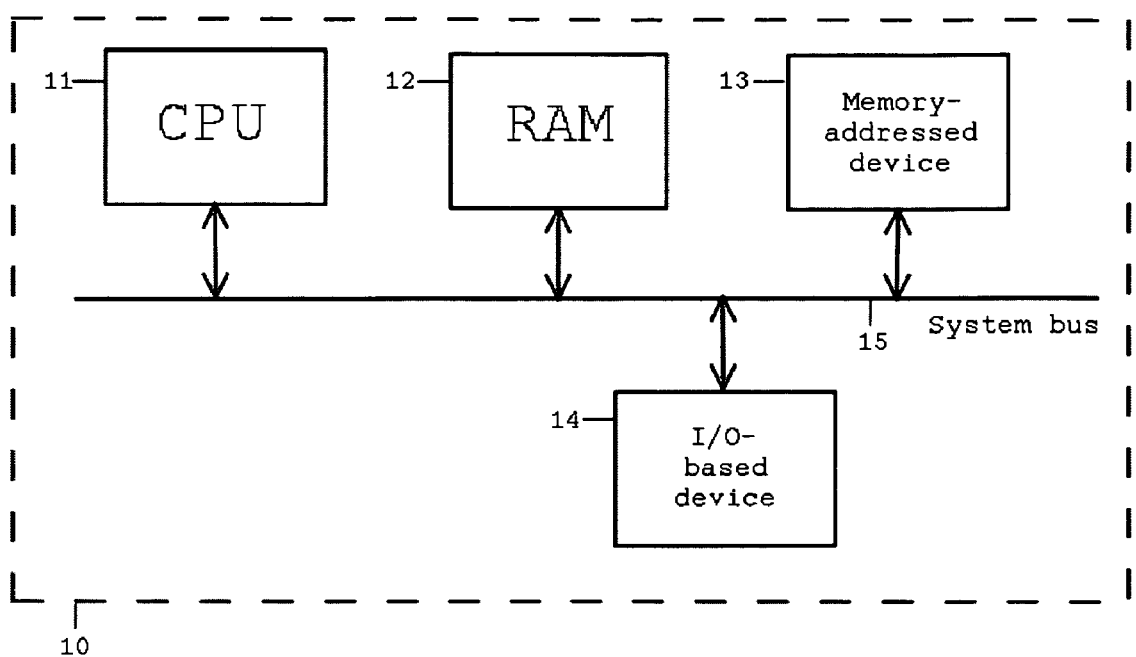
FIG. 1A shows a block diagram of a computer system required to implement the present invention.
Figure 1B:
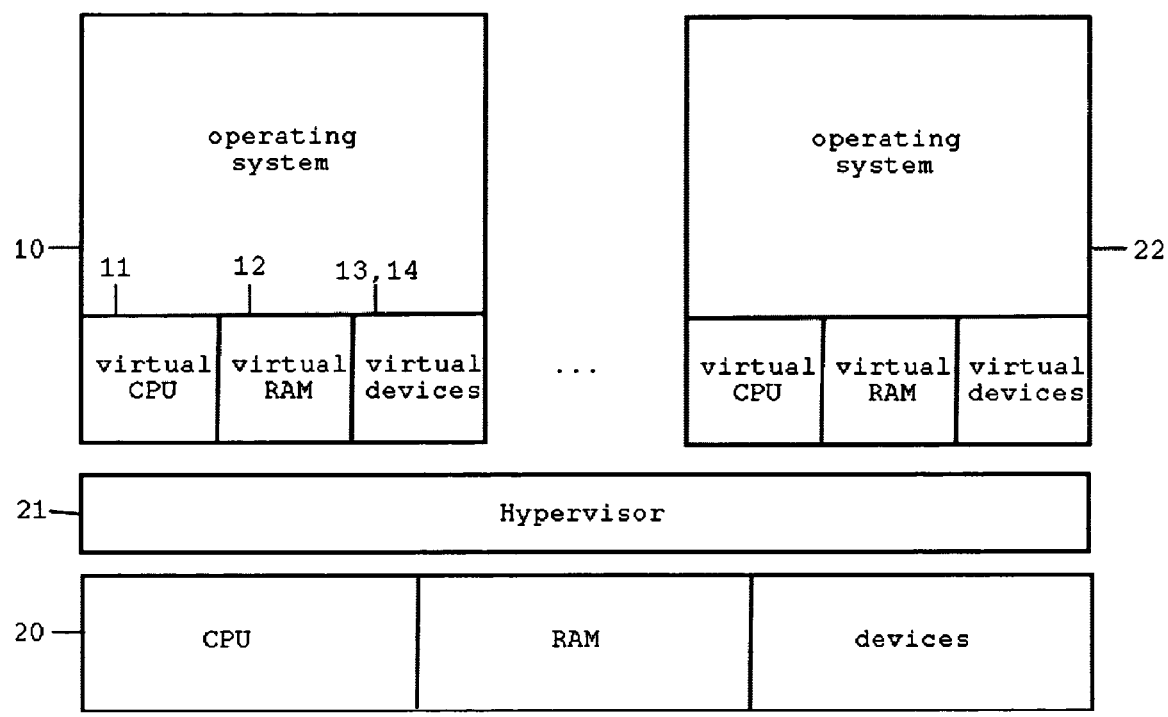
FIG. 1B shows a virtual machine environment hosting the computer system shown in FIG. 1A as guest in some embodiments of the present invention.
Figure 1C:
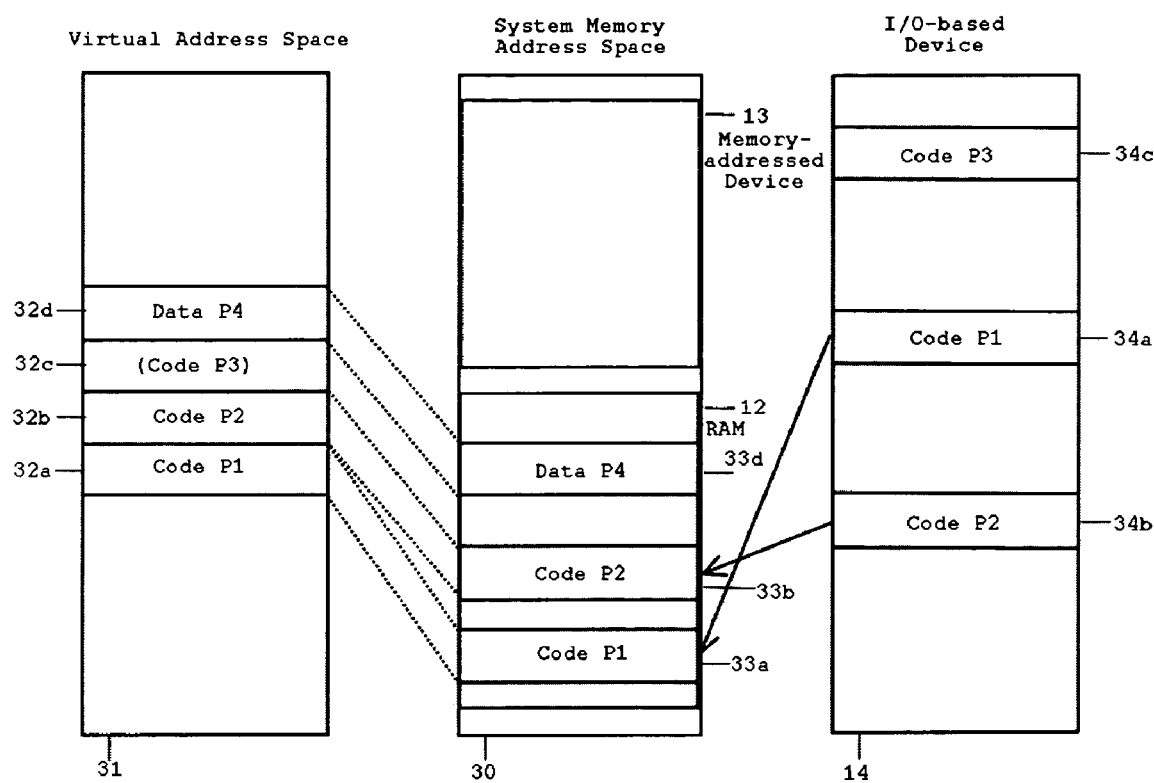
FIG. 1C shows a virtual memory and demand paging functionality provided by prior art operating systems.

All components directly accessible by CPU 11 for memory operations constitute the system memory address space 30 of computer system 10, as shown in FIG. 1C. RAM 12 and memory-addressed devices 13 are part of system memory address space 30; in addition other components (not shown) may be part of system memory address space 30, e.g. read-only memory ("ROM") or a video card frame buffer. Every program instruction executed by CPU 11 and all memory data accessed by instructions executed by CPU 11 must be present within system memory address space 30 at the time execution occurs. In order to increase the apparent size of available memory, and to protect different application programs running on the same computer system concurrently from accidentally modifying each other's memory, the operating system provides to each application program a "virtual address space", and provides access to selected parts of the system memory address space within the virtual address space. While CPU 11 is executing application code, it can only access memory present in the application's virtual address space. To translate between a virtual address space and the system memory address space, both the virtual address space and the system memory address space are divided into chunks of equal size, typically referred to as "pages".

FIG. 1C depicts the system memory address space 30 of computer system 10. In addition, the virtual address space 31 of an application program is shown. For each page that can be addressed within virtual address space 31, there must exist a page descriptor which describes the state of that page in reality. The page may or may not reside in system memory address space 30 at any instant. If the page is present in system memory address space 30, the page descriptor will indicate that fact and will indicate the location of the page within system memory address space 30. If the page is not present in system memory address space 30, the descriptor will indicate that fact, and will contain additional information that allows the operation system to locate the contents the application program expects to access via this page. The collection of all page descriptors for a virtual address space is called a page table. The page table for a virtual address space is maintained by the operating system.

While CPU 11 is executing application code in virtual address space 31, every memory address accessed by CPU 11 is translated from a virtual address in virtual address space 31 to a system memory address in system memory address space 30, using the page table for virtual address space 31. This translation is performed by a paging mechanism, which can be a hardware or software implementation or a combination of both. For some embodiments, the paging mechanism is implemented by a paging unit present in CPU 11. When CPU 11 accesses a page in virtual address space 31 that currently does not have a corresponding page in system memory address space 30, the paging mechanism causes CPU 11 to generate a page fault interrupt. The interrupt causes operating system code referred to as the "page fault handler" to bring the required contents into some page in system memory address space 30 and update the page table in order to map the virtual page to this page in system memory address space 30. The application can then continue to run and access the page. This process is typically referred to as "demand paging".

In the example situation depicted in FIG. 1C, virtual address space 31 currently holds four pages. Three pages (32a-32c) contain application code that is currently being executed, one page (32d) contains data that is accessed by the application. The application code contained in pages 32a-32c is loaded from an application program file resident on I/O-based device 14 in blocks 34a-34c. Application code pages 32a and 32b are in fact currently present in system memory address space 30 and reside in pages 33a and 33b of RAM 12; likewise data page 32d is present in system memory address space and resides in page 33d of RAM 12. Application code page 32c is currently not present in system memory address space 30. Once the application accesses page 32c, the operating system's page fault handler will allocate a fresh page 33c (not shown) in RAM 12, perform an I/O operation to copy the contents of block 34c into page 33c, and update the page table to map page 32c of virtual address space 31 to page 33c of system memory address space 30. For pages 32a and 32b this process was already completed at the instant depicted in FIG. 1C. Data page 32d/33d holds contents generated by the application at run time, it was not loaded from I/O-based device 14.

Figure 1D:
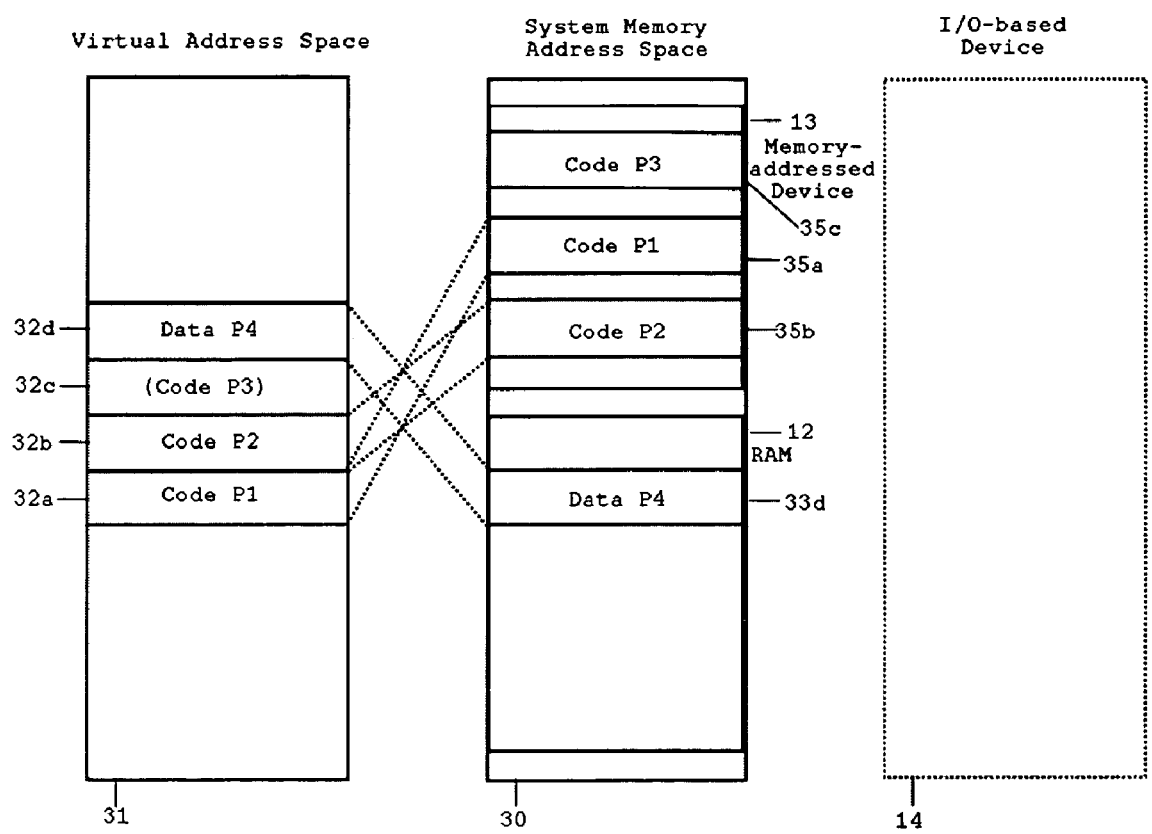
FIG. 1D shows the execute-in-place functionality provided by prior art operating systems.

As seen in the FIG. 1C, when CPU 11 executes an application program residing on I/O-based device 14, pages of RAM 12 are required to hold the application program's code while it is executing. If, however, the application program resides on a memory-addressed device, this is not required, making more pages of RAM 12 available for other purposes (or in the alternative allowing computer system 10 to fulfill its intended task with a smaller total amount of RAM). This process is typically referred to as "execution in place". FIG. 1D depicts the same application running in virtual address space 31 as FIG. 1C did, however now the application resides on memory-addressed device 13 instead of on I/O-based device 14, and is executed in place. As depicted in FIG. 1D, application code from the application program file resides in blocks 35*a-c* of memory-addressed device 13. As memory-addressed device 13 is present in system memory address space 30, blocks 35*a* and 35*b* can be directly mapped to pages 32*a* and 32*b* of virtual address space 31, respectively. Likewise, once the application accesses page 32*c*, the operating system's page fault handler will simply establish another mapping between page 32*c* of virtual address space 31 and page 35*c* of system memory address space 30; the operating system does not need to allocate any page in RAM 12. Note that data page 32*d*, however, is mapped to page 33*d* of RAM 12, just as it was in the scenario depicted in FIG. 1C.

Figure 1E:
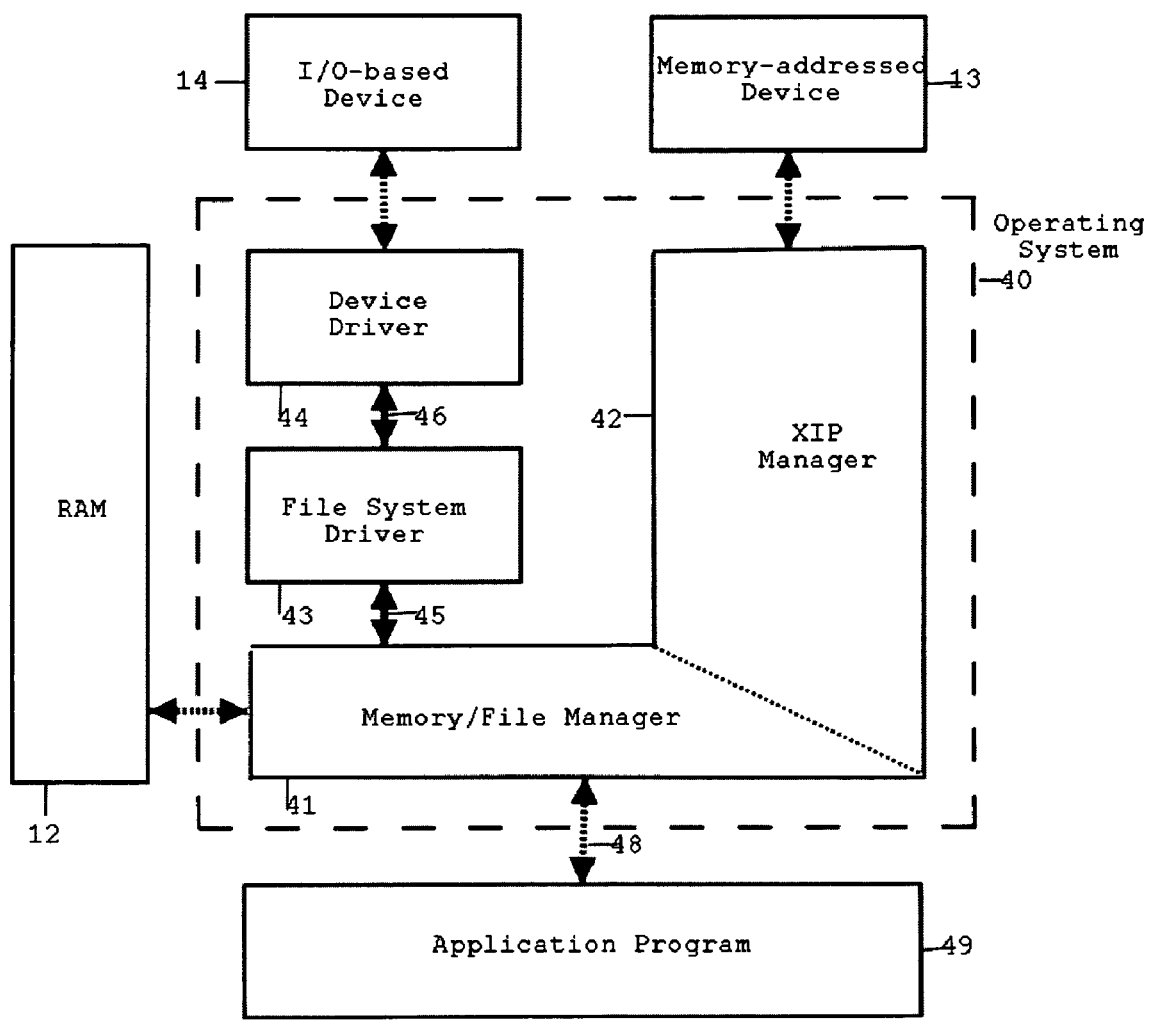
FIG. 1E shows the component structure of a prior art operating system implementing execute-in-place.

FIG. 1E visualizes the component structure of a prior art operating system 40 not embodying the present invention. Only those components required to implement the demand-paging and execute-in-place functions depicted in FIGS. 1C and 1D are shown. Operating system 40 contains a memory/file manager 41 that handles requests from application program 49 via interface 48 to access files residing on either I/O-based device 14 or memory-addressed device 13. To access files on I/O-based device 14, memory/file manager 41 interacts with file system driver 43 via file system I/O interface 45, which in turn interacts with device driver 44 via device I/O interface 46. Operating system 40 may contain multiple versions of file system drivers, each responsible for handling a specific file system type; every file system driver implements the same file system I/O interface 45. Likewise, operating system 40 may contain multiple versions of device drivers, each responsible for handling a specific device type; every device driver implements the same device I/O interface 46.

Within the component structure of operating system 40 as depicted in FIG. 1E, the responsibility of device driver 44 (and all device drivers) is to copy data from specified locations on the I/O-based device into RAM and vice versa. The device driver does not have any knowledge about the contents of the device or the way these contents are organized. Data residing on the device is typically divided into chunks called "blocks", each identified by a "block number". Device I/O interface 46 allows to request of a device driver to copy data from a block identified by block number B into a block of RAM starting at address A, or vice versa.

To allow for structured storage of data on a device, operating system 40 provides file system drivers. A file system driver allows to access data stored on a device as a collection of "files", each providing the abstraction of an ordered sequence of bytes. Every file is identified by some means provided by the file system, typically a "file name". The file system keeps track of which bytes of each file are stored in which blocks of the underlying device. The information required to perform this record keeping is usually called "file system meta-data", and is itself stored on the underlying device. The specific layout of the file system meta-data varies from file system to file system. Within the component structure of operating system 40 as depicted in FIG. 1E, it is the responsibility of file system driver 43 (and all file system drivers) to implement all necessary logic to handle the file system meta-data layout. File system I/O interface 45 allows to request of a file system driver to copy data from a file F identified by some file name, starting at a specified offset O within file F, into a block of RAM starting at address A, and vice versa. To handle such a request, the file system driver will consult the file system meta-data to determine which block B of the underlying device holds the data corresponding to offset O within file F, and use device I/O interface 46 of the device driver handling the underlying device to copy between block B of said device and the specified block of memory.

Within the component structure of operating system 40 as depicted in FIG. 1E, the demand-paging function shown in FIG. 1C is therefore implemented as follows: when an application accesses a page not currently present in the system memory address space, the operating system's page fault handler (usually part of memory/file manager 41) will determine from the page descriptor what contents the application expected the page to have. The page descriptor identifies said contents by specifying a file F and an offset O within file F where said contents are to be found. Memory/file manager 41 will then allocate a fresh page in RAM 12, and request from file system driver 43 via file system I/O interface 45 to copy data from offset O within file F into said fresh page. As described above, file system driver 43 will consult the file system meta-data to determine which block B of the underlying device (in this case I/O-based device 14) holds that data, and then use device I/O interface 46 of device driver 44 to copy that data into said fresh page. Once the I/O operation has completed, memory/file manager 41 will update the page table accordingly.

However, it is not possible to perform execute-in-place accesses to files residing on memory-addressed device 13 using file system driver 43, because the prior art file system I/O interface 45 is not suitable for that purpose. Instead, within the component structure of operating system 40 as depicted in FIG. 1E, execute-in-place accesses are handled by XIP manager 42, which is tightly integrated into memory/file manager 41, and directly accesses memory-addressed device 13. XIP manager 42 is thus responsible both for actually accessing memory-addressed device 13 and handling the file system layout of the data stored on said device. It is not possible to access data on memory-addressed device 13 using any other file system layout than those supported by XIP manager 42, even if operating system 40 would otherwise provide a file system driver for such a file system.

Figure 2A:
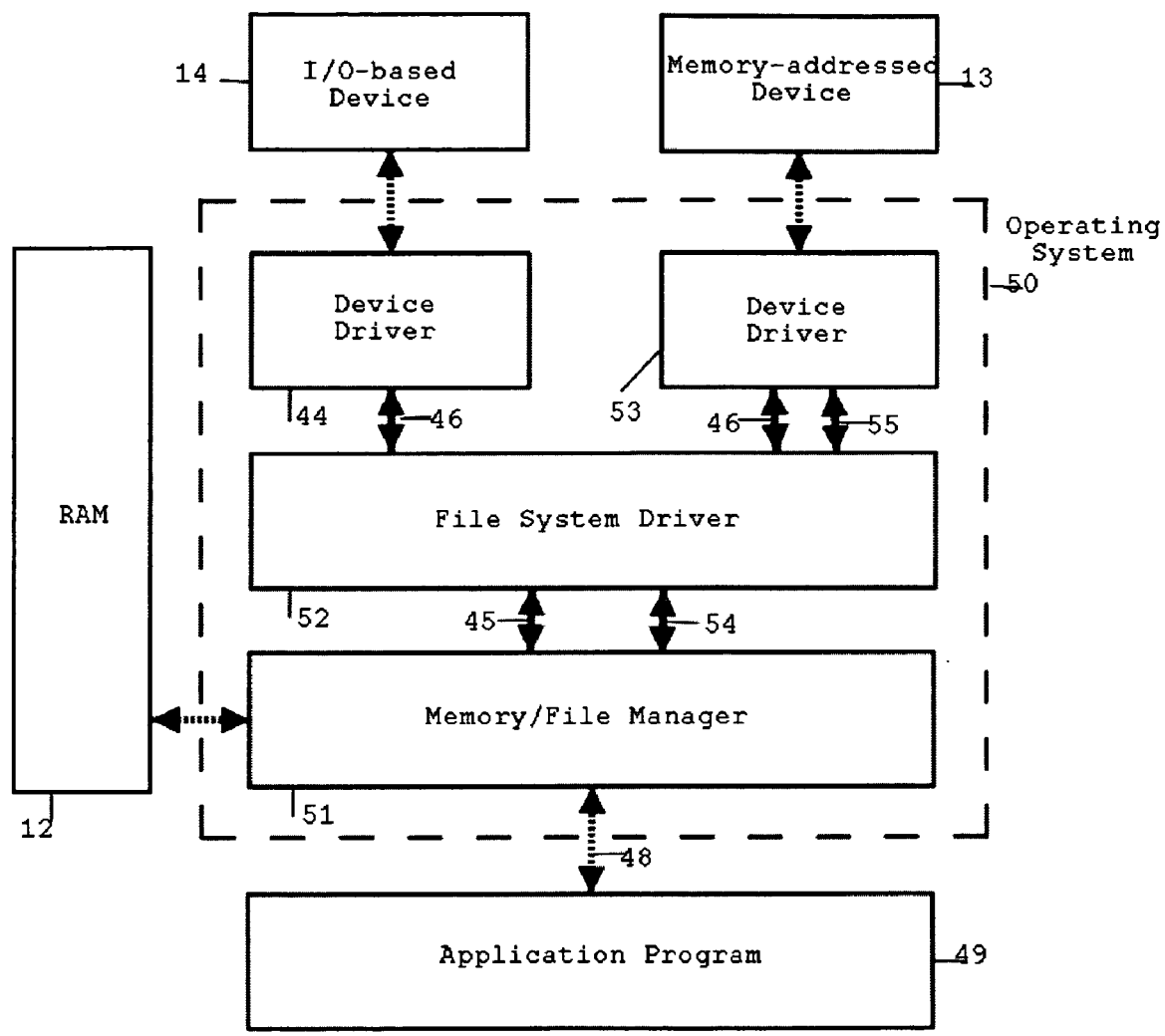
FIG. 2A shows the component structure of an operating system implementing execute-in-place using the present invention.

The present invention removes this restriction. FIG. 2A shows the component structure of operating system 50 implementing execute-in-place access to memory-addressed device 13 embodying the present invention. As compared to prior art operating system 40 depicted in FIG. 1E, operating system 50 maintains the same interfaces to all hardware components of computer system 10 (RAM 12, I/O-based device 14, memory-addressed device 13). It also uses the same interface 48 to application program 49. Memory/file manager 51 is a modified version of memory/file manager 41 provided by the prior art (see FIG. 1E), and file system driver 52 is a modified version of file system driver 43 provided by the prior art (see FIG. 1E). Operating system 50 also provides device driver 53 accessing memory-addressed device 13. Note that some prior art versions of operating system 40 may have also provided a device driver likewise accessing memory-addressed device 13, but such drivers implemented only device I/O interface 46 (see FIG. 1E) and were thus unable to provide execute-in-place functionality. This functionality was implemented by XIP manager 42, which however directly accesses memory-addressed device 13 without using any device driver. As shown in FIG. 2A, the present invention no longer requires a XIP manager component. Instead, execute-in-place functionality is now integrated into the existing components memory/file manager 51, file system driver 52, and device driver 53. This is possible by utilizing two new interfaces: file system direct-access interface 54 provided by file system driver 52, and device direct-access interface 55 provided by device driver 53. The core feature of device direct-access interface 55 is to provide a means to retrieve the system memory address A of a block B of a memory-addressed device present in the system memory address space. Similarly, the core feature of file system direct-access interface 54 is to provide a means to retrieve the system memory address A of the contents of a file F at offset O where file F resides on a memory-addressed device present in the system memory address space. The use of these direct-access interfaces will be described in more detail below.

As depicted in FIG. 2A, operating system 50 interacts through interface 48 with application program 49. One part of interface 48 consists of demand-paging requests triggered by application program 49 accessing a page of its virtual address space 31 not currently mapped to a page of system memory address space 30. (Note that virtual address space 31 and system memory address space 30 are as shown in FIGS. 1C and 1D, where virtual address space 31 corresponds to the virtual address space of application 49.) Other parts of interface 48 consist of requests ("system calls") by application program 49 to operating system 50 to read, write, or otherwise access contents of files residing on I/O-based device 14 or memory-addressed device 13. Memory/file manager 51 is the component of operating system 50 handling requests by application program 49 via interface 48. In order to access contents of files residing on I/O-based device 14 or memory-addressed device 13, memory/file manager 51 interacts with file system driver 52 via file system I/O interface 45 and/or file system direct-access interface 54. Operating system 50 may contain multiple versions of file system drivers, each responsible for handling a specific file system layout. All file system drivers implement the same file system I/O interface 45, and some file system drivers implement in addition file system direct-access interface 54, which is suitable to perform execute-in-place access to files residing on memory-addressed devices. File system driver 52 interacts with device drivers 44 and 53 via device I/O interface 46 and/or device direct-access interface 55. Operating system 50 may also contain multiple versions of device drivers, each responsible for handling a specific type of devices. All device drivers implement the same device I/O interface 46, and device drivers for memory-addressed devices 13 may in addition implement device direct-access interface 55, which is suitable to perform execute-in-place access to files residing on memory-addressed devices 13.

Figure 2B:
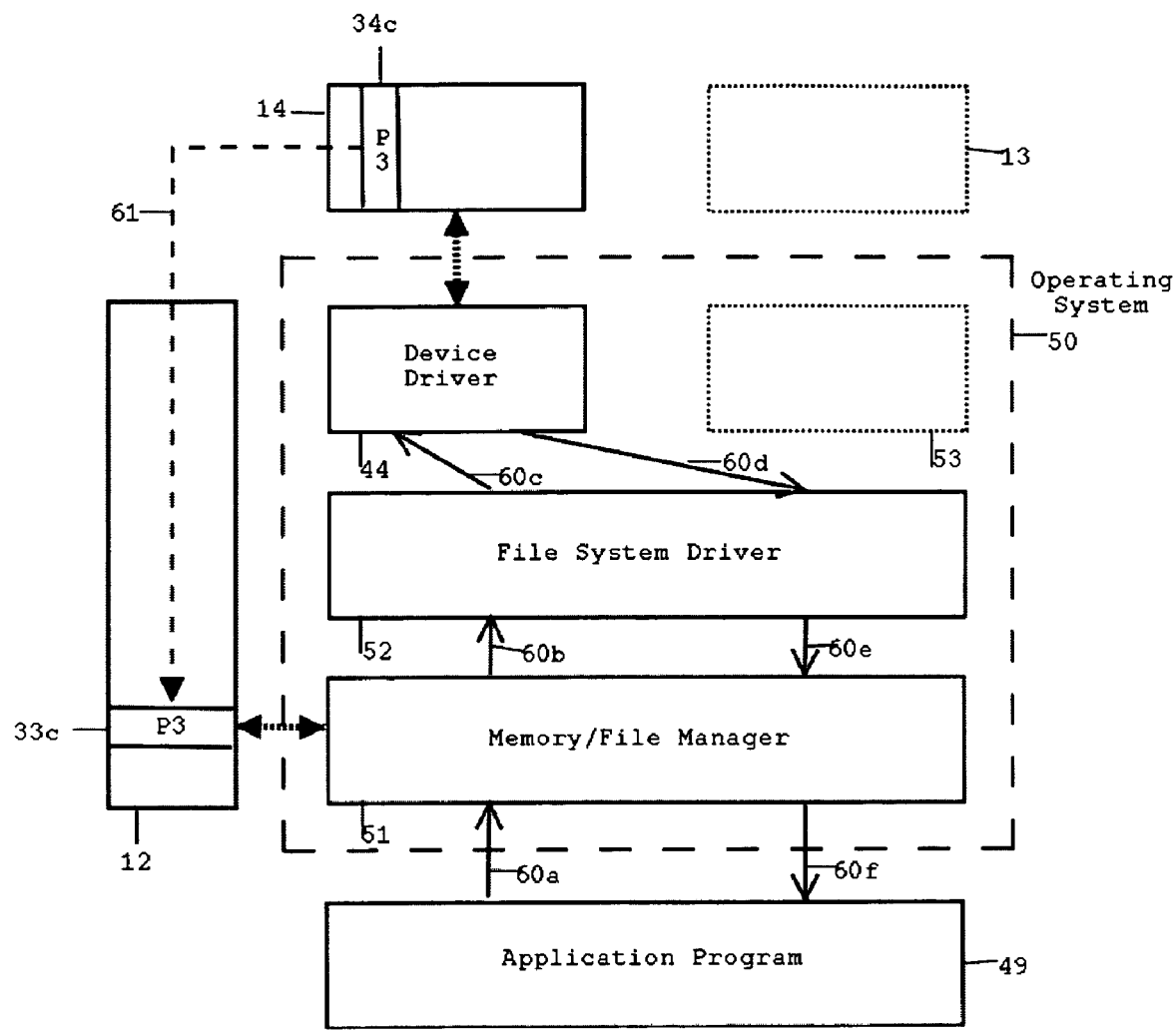
FIG. 2B shows the flow of control through components of the operating system from FIG. 2A used to access an I/O-based device according to the present invention.
Figure 2C:
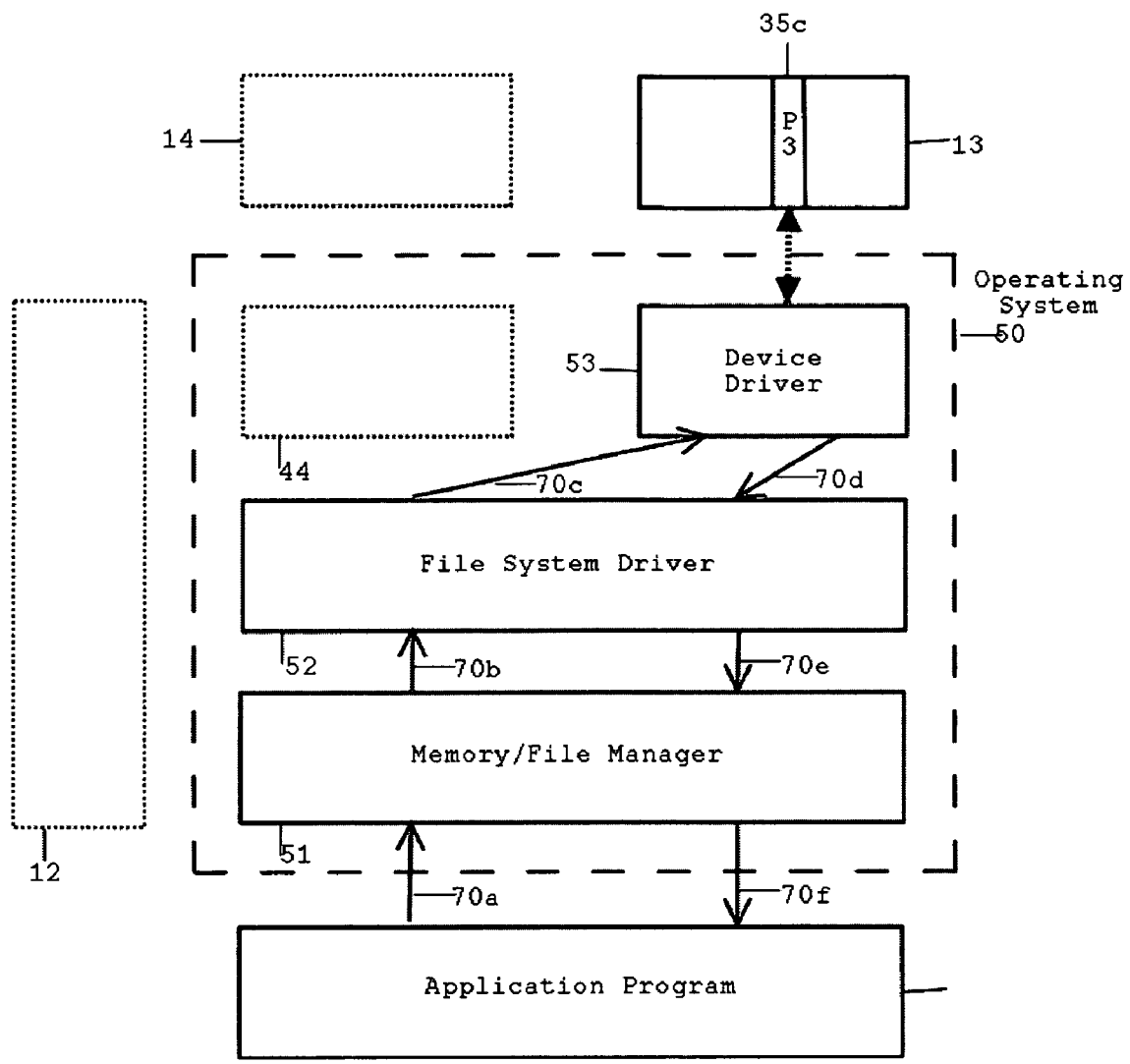
FIG. 2C shows the flow of control through components of the operating system from FIG. 2A used to perform an execute-in-place access to a memory-addressed device according to the present invention.
Figure 2D:
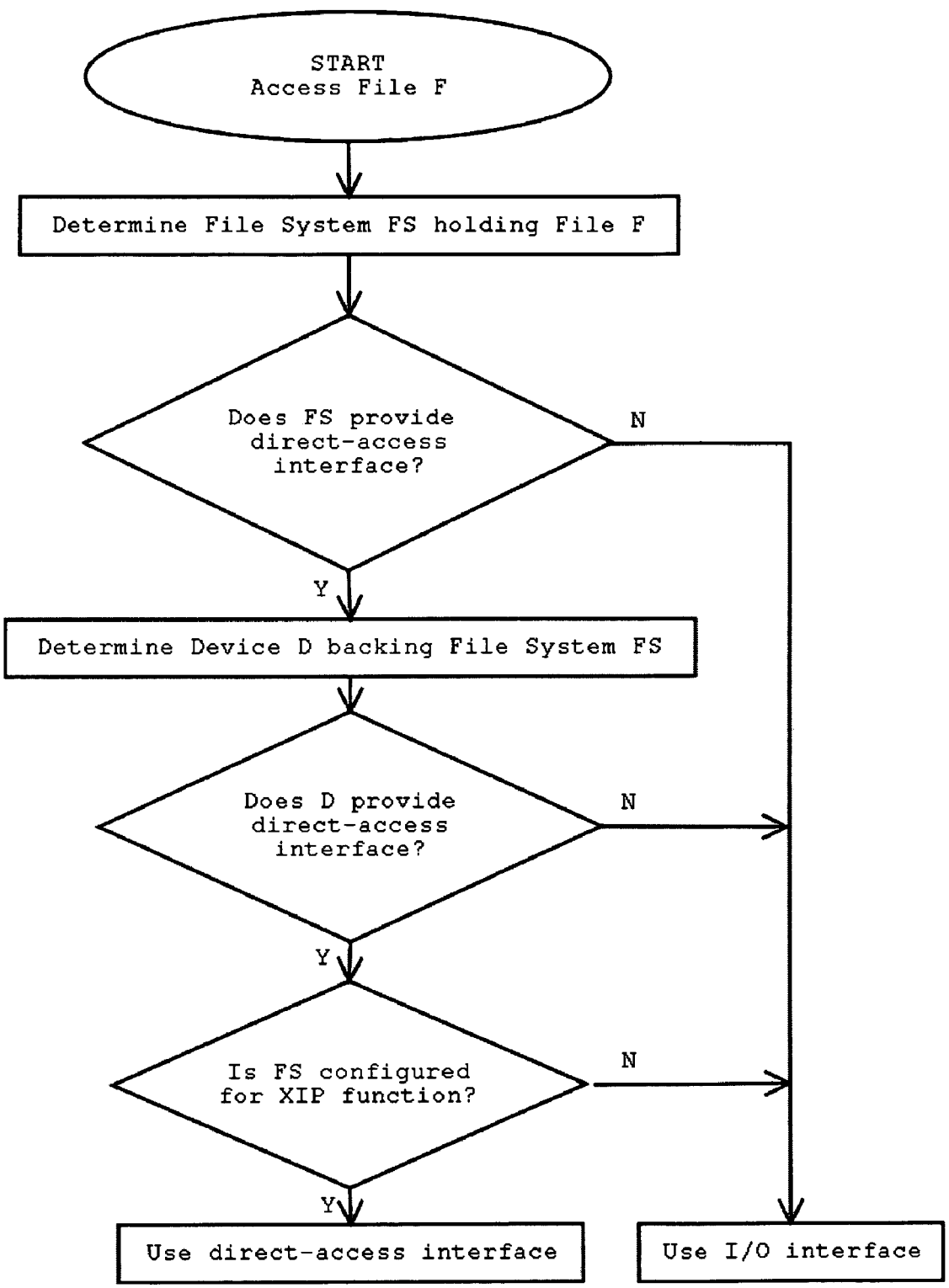
FIG. 2D shows the decision logic by the operating system from FIG. 2A used to choose which of the two control flows depicted in FIGS. 2B and 2C to use.

For file system drivers providing both I/O interface 45 and direct-access interface 54, memory/file manager 51 is able to perform both regular accesses and execute-in-place accesses to files handled by such file system drivers. FIGS. 2B and 2C depict in more detail the flow of control required to perform regular and execute-in-place accesses, respectively. FIG. 2D will detail the decision logic required to choose which of the two methods to use for any particular file access.

FIG. 2B depicts the flow of control when operating system 50 handles a request to access a file residing on I/O-based device 14. Note that this flow of control is identical to the one used by prior art operating system 40 for a corresponding access. The steps of the control flow are represented by actions 60a-f, in sequence. The specific actions depicted here correspond to the situation shown in FIG. 1C, after application 49 has tried to access page 32c of virtual address space 31. As this page is not currently mapped to any page of system memory address space 30, a page fault interrupt is generated, and handled by the memory/file manager 51 component of operating system 50. This is represented in FIG. 2B by action 60a. Memory/file manager 51 reads from the page descriptor for page 32c that the application expects its contents should correspond to the contents of file F at offset O. It determines that file F resides on a file system handled by file system driver 52. It further determines that file F does not support execute-in-place (this is explained in more detail below). It then allocates a free page 33c in RAM 13 and determines its system memory address A, and requests via file system I/O interface 45 of file system driver 52 to copy the contents of file F at offset O into the page at system memory address A (action 60b). File system driver 52 determines that the data at offset O of file F resides on block B of I/O-based device 14, and that device driver 44 is responsible for accessing I/O-based device 14. It then requests via device I/O interface 46 of device driver 44 to copy block B of I/O-based device 14 into the page at system memory address A (action 60c). Device driver 44 effects an I/O operation 61 on I/O-based device 44 to perform that copy. Once I/O operation 61 has completed, device driver 44 reports completion to file system driver 52 via device I/O interface 46 (action 60d), which likewise reports completion to memory/file manager 51 via file system I/O interface 45 (action 60e). Memory/file manager 51 finally establishes a mapping of page 32c of virtual address space 31 to page 33c at address A of system memory address space 30, which now holds the requested contents (action 60f).

FIG. 2C depicts likewise the flow of control when operating system 50 handles a request to perform an execute-in-place access to a file residing on memory-based device 13. Note that this flow differs from the one used by prior art operating system 40 for a corresponding access, and uses the new direct-access interfaces described by the present invention. Note further that some accesses to files on memory-based device 13 may not be suited to execute-in-place access; in such cases a regular I/O access to the file is performed instead, using the equivalent control flow as the one depicted in FIG. 2B and described above. This is possible since device driver 53 also implements device I/O interface 46, just like device driver 44 does.

The steps of the control flow show in FIG. 2C are represented by action 70a-f, in sequence. The specific actions depicted here correspond to the situation shown in FIG. 1D, after application 49 has tried to access page 32c of virtual address space 31. As in FIG. 2B, a page fault interrupt is generated and handled by memory/file manager 51 (action 70a), which again reads from the page descriptor for page 32c that the application expects its contents should correspond to those of file F at offset O. It again determines that file F resides on a file system handled by file system driver 52. It further determines that file F does support execute-in-place (this is explained in more detail below). It now requests via file system direct-access interface of file system driver 52 to retrieve the system memory address of the contents of file F at offset O (action 70b). File system driver 52 determines that the contents of file F at offset O reside on block B of memory-addressed device 13, and that device driver 53 is responsible for accessing memory-addressed device 13. It then requests via device direct-access interface 55 of device driver 53 to retrieve the system memory address of block B of memory-addressed device 13 (action 70c). Device driver 53 determines that block B of memory-addressed device 13 corresponds to page 35c of system memory address space 30, and returns its address A via device direct-access interface 55 to file system driver 52 (action 70d), which likewise returns address A via file system direct-access interface 54 to memory/file manager 51 (action 70e). Memory/file manager 51 finally establishes a mapping of page 32c of virtual address space 31 to page 35c at address A of system memory address space 30 (action 70f).

FIG. 2D shows the control flow within operating system 50 (FIG. 2A) when deciding whether to use the file system I/O interface or the file system direct-access interface to access a file F. The operating system first determines which file system driver is responsible for file system FS holding file F. If the file system driver does not support the file system direct-access interface at all, the file system I/O interface is used. Otherwise, the operating system determines which device driver is responsible for device D underlying file system FS. If the device driver does not support the device direct-access interface at all, the file system I/O interface is used as well. Otherwise, the operating system determines whether file system FS was configured by the user for execute-in-place access to file F. If yes, the file system direct-access interface is used, otherwise the file system I/O interface is used. In some embodiments, the user may only choose to allow execute-in-place access to either all files on FS or none of them. In other embodiments, the user may make that choice separately for each single file. Additionally, in some embodiments it may only be possible to allow execute-in-place access if other configurable file system parameters have been set by the user to values compatible with execute-in-place; for example it may be necessary to configure the file system block size to a value that is equal to or a multiple of the system memory page size.

Note that the operating system does not necessarily execute the full decision logic shown in FIG. 2D for every single access to a file F. Instead, the choice may be made once when file F is first accessed and remembered in operating system data structures associated with file F; subsequent accesses will reuse the outcome of the decision stored in said data structures.

FIGS. 3A-I show in further detail one embodiment of the present invention within the Linux operating system. The present invention integrates the execute-in-place functionality into the standard operating system I/O component structure by extending its interfaces instead of replacing it as a whole. Linux provides the following component layers related to performing I/O operations:

the device driver layer, which allows to access a backing store device without the need of knowledge of the specific hardware involved, the file system layer, which allows to access backing store using a logical file view without the need of knowledge about a backing store device, the memory management layer, which allows to execute an application without the need of knowledge by the application about the virtual memory and dynamic address translation techniques used by the operating system.

Figure 3A:
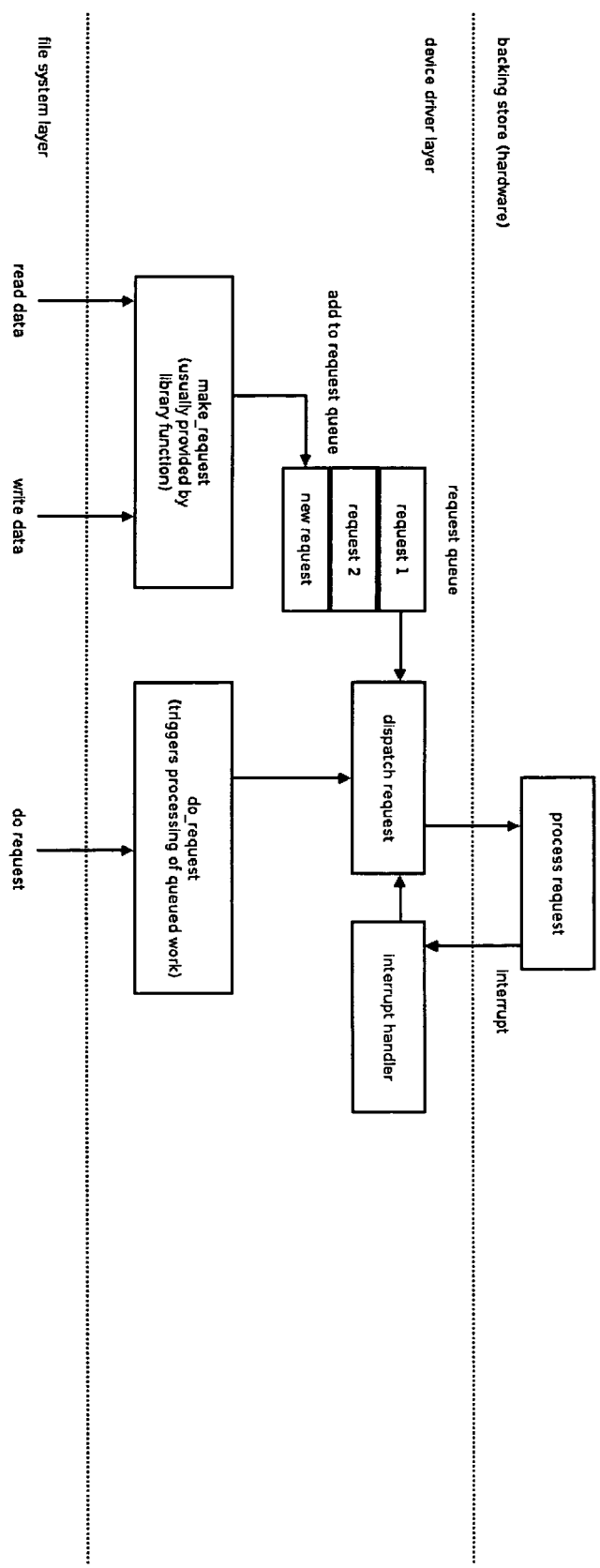
FIG. 3A shows the device abstraction implemented in a prior art Linux operating system.

FIG. 3A shows the device abstraction implemented in many modern operating systems. This example shows a device driver in Linux. The make_request function is called to submit requests to read/write data from/to the device. The request_queue and the do_request functions are part of optimizations inside Linux. The device driver will run in the loop "dispatch request->process request->interrupt handler->dispatch request" until all work submitted to it is done.

The device driver layer allows to submit read or write requests. The frequent user of this layer is the file system's readpage(s)/writepage(s) operations, which transfer data from/to files. In order to address the data, a physical block number is used.

Figure 3B:
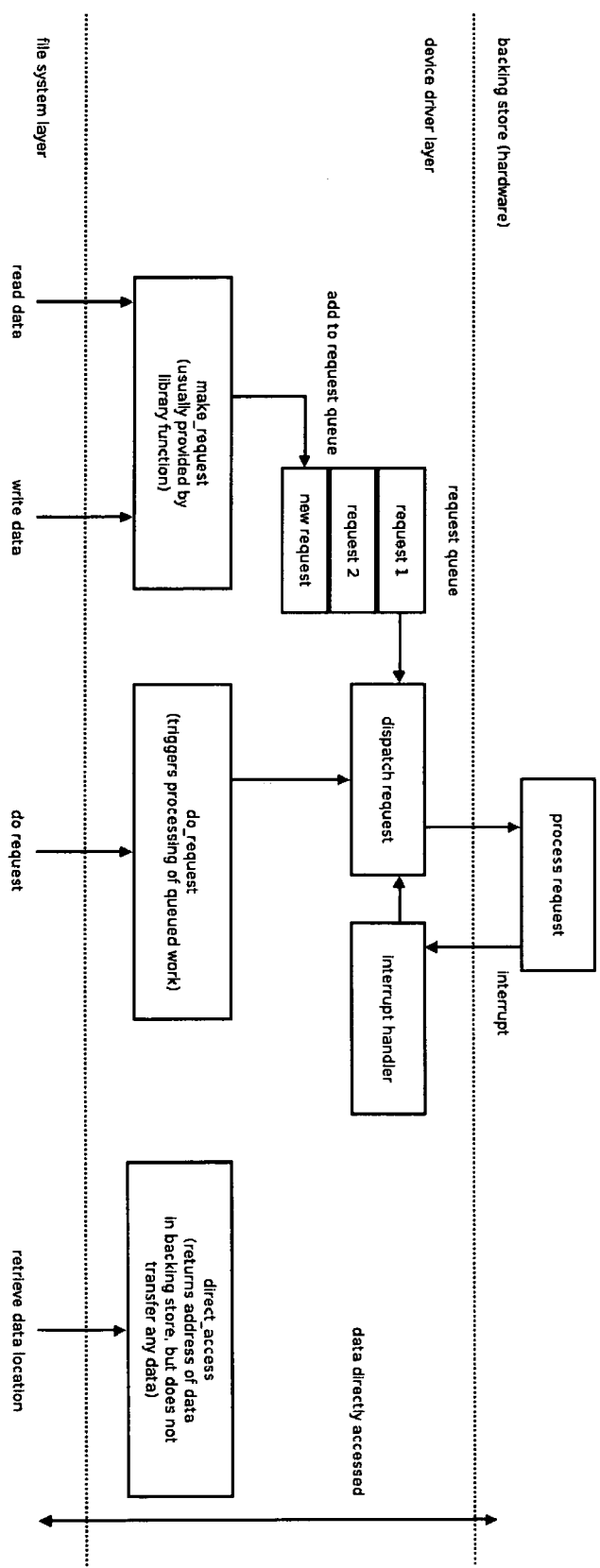
FIG. 3B shows the extension done to the device driver layer in a Linux operating system implementing the present invention.

The present invention provides an extension to the device driver layer's interface, illustrated in FIG. 3B. While keeping the existing interface intact, the extension provides a function that can be used to get a direct reference to data on the device. This reference can be used to access data on the device without the need to submit requests and wait for their completion. This extension can optionally be implemented by device drivers that access memory-addressed devices. The new operation direct_access gets a phyical block number similar to make_request, but does not transfer any data. Instead, a reference to the data is returned. This reference can be used to read or write any data to the physical block anytime from now until the device is closed/unmounted again without further interaction with the device driver layer. Use of the new interface is optional, the traditional make_request interface remains intact for users that do not support the new interface like the raw device driver. The traditional interface is important to support general purpose file systems which use it to transfer file system meta-data (inodes, directory entries etc.).

Figure 3C:
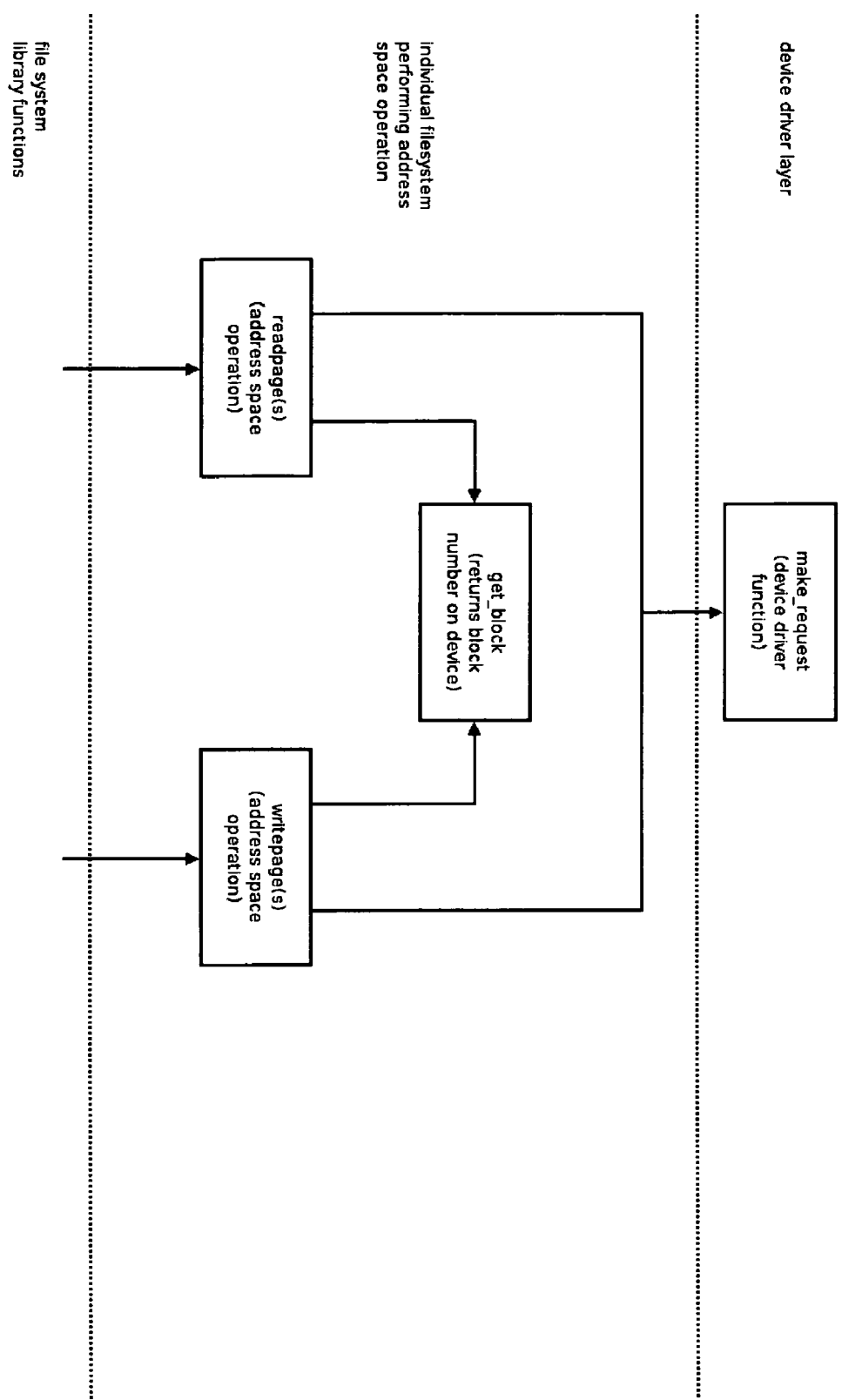
FIG. 3C shows how a general purpose file system serves an address space operation to read/write one or more page(s) from/to the device in a prior art Linux operating system.

FIG. 3C illustrates how a general purpose file system in Linux can implement address space operations using the device driver's make_request function. The readpage(s)/writepage(s) functions use the get_block function [repeatedly when processing multiple pages] to identify the physical block number(s) on the device associated with the subject page(s). The make_request function as shown in FIG. 3A is used to access the data. In Linux, file systems typically use address space operations together with file system library functions to perform file operations like sys_read( ) and sys_write( ). Use of these address space operations and library functions is optional but most general purpose file systems use them. The address space operations readpage( ), readpages( ), writepage( ), and writepages( ) are used to read/write one or more memory pages of data from/to the device driver. In order to address a memory page, a logical file handle and an offset are used. This addressing is translated to physical block number by the file system.

Figure 3D:
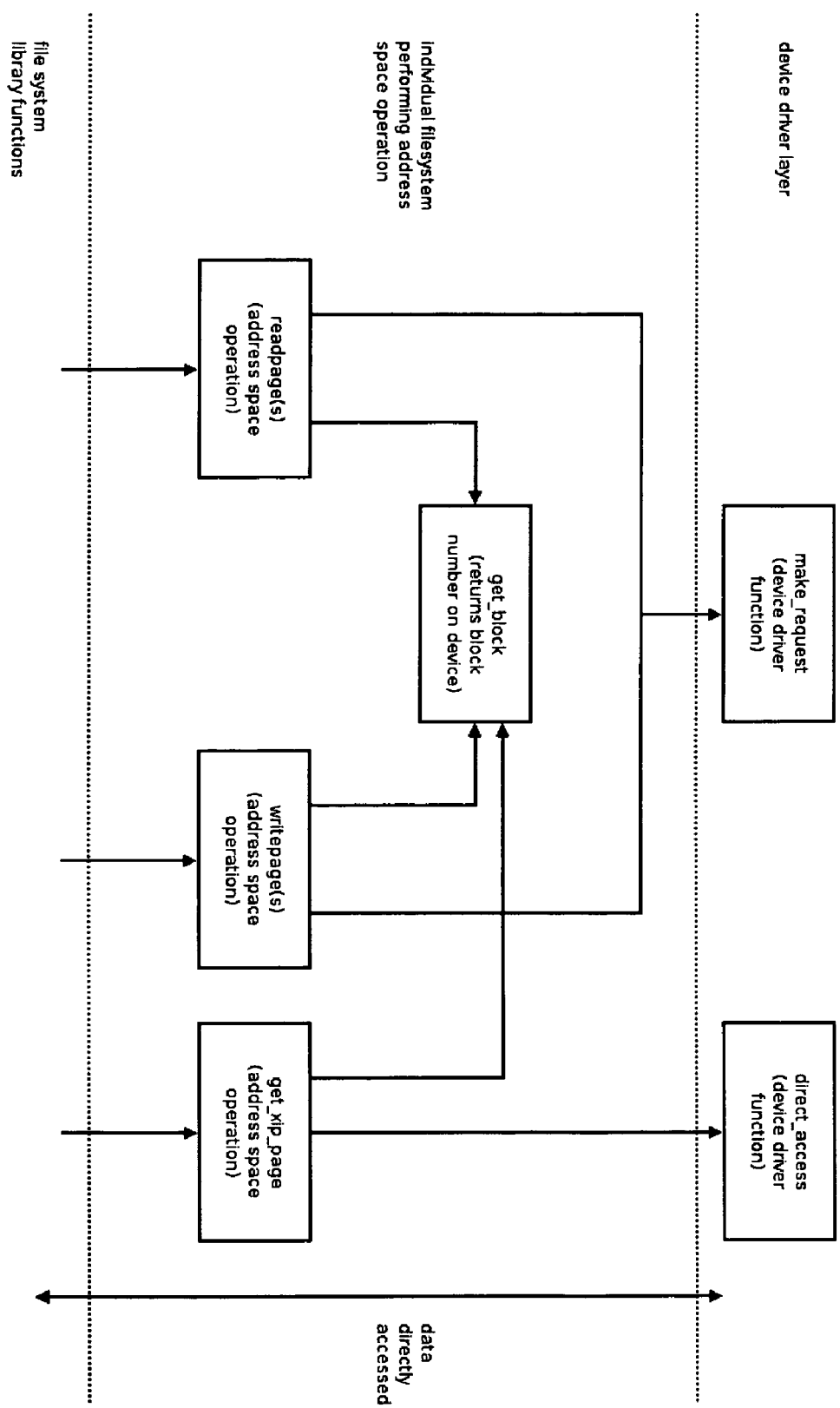
FIG. 3D shows the extension done to the address space operations of the file system in a Linux operating system implementing the present invention.

The present invention provides an extension to the address space operation interface by a function named get_xip_page that allows to retrieve a reference to the storage behind a given memory page, as illustrated in FIG. 3D. This function uses a file handle and an offset for addressing, translates it to a physical block number by calling the get_block function, and retrieves a reference to the storage behind that physical block from the device driver layer's direct_access function (as described in FIG. 3B). This reference can be used to read or write any data to the physical block anytime from now until the file is truncated, or the file system is unmounted without further interaction with the file system or the device driver layer. Use of the new interface is mandatory when supported, for data integrity reasons either the traditional readpage(s)/writepage(s) interface or the new get_xip_page interface is supported for a file. File systems are free to choose either on a per-file basis.

Figure 3E:
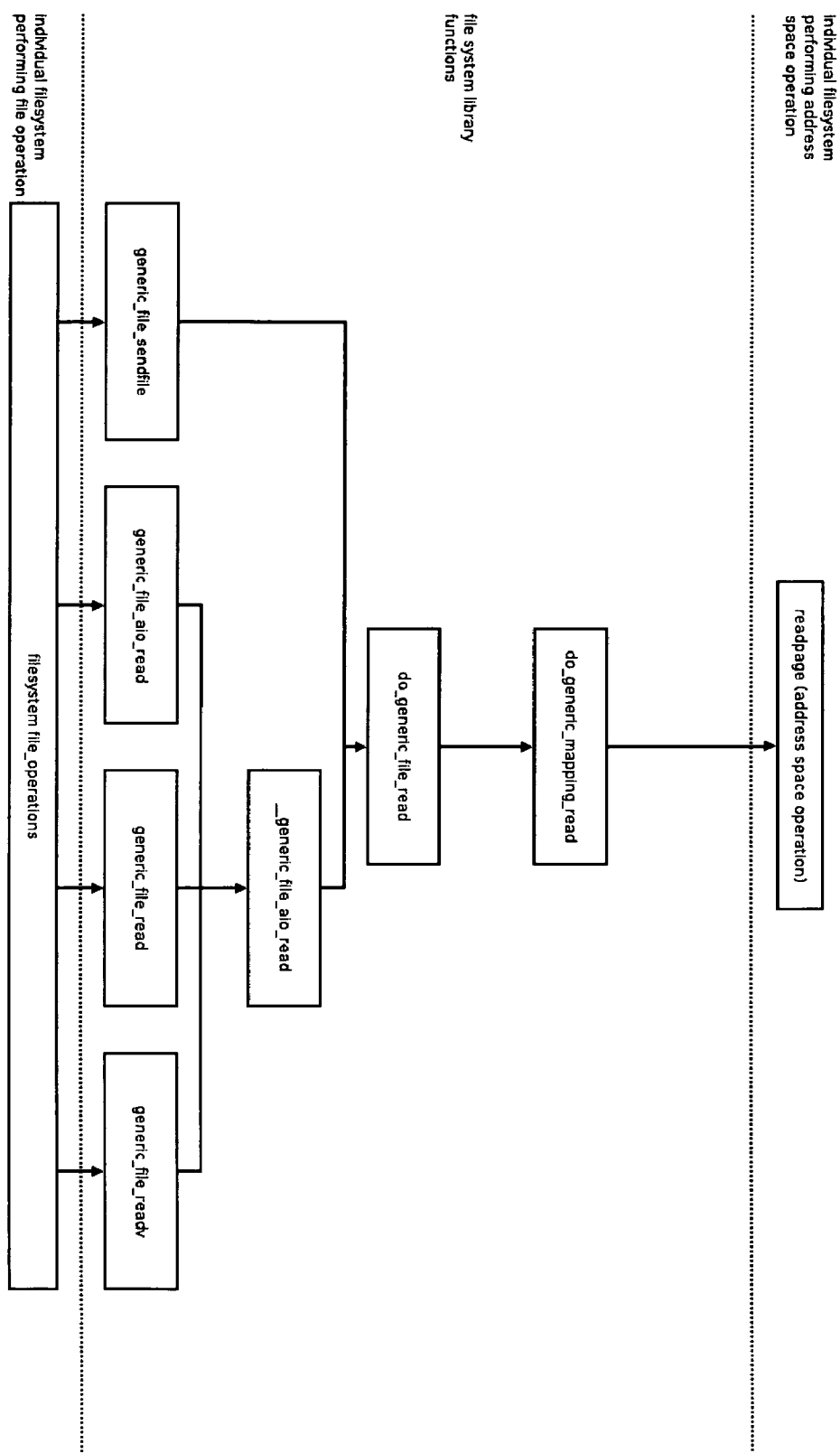
FIG. 3E shows how the file system library functions perform read type file operations for a general purpose file system in a prior art Linux operating system.

The main user of readpage(s)/writepage(s) functions are the file system library functions. FIG. 3E illustrates how the file system library functions perform read-type file operations for a general purpose file system in Linux.

The generic_file_read function performs the file operation associated with the sys_read( ) system call.

The generic_file_readv function performs the file operation associated with the sys_readv( ) system call.

The generic_file_aio_read function performs read operations associated with asynchronous IO system calls.

The generic_file_sendfile file operations performs the file operation associated with the sys_sendfile( ) system call.

All these functions indirectly call generic_mapping_read, which uses the readpage(s) functions (as shown in FIG. 3C) to read one or multiple page(s) from the device. Although use of these functions is optional for a file system, most general purpose file systems use them instead of doing their own implementation of file operations.

Figure 3F:
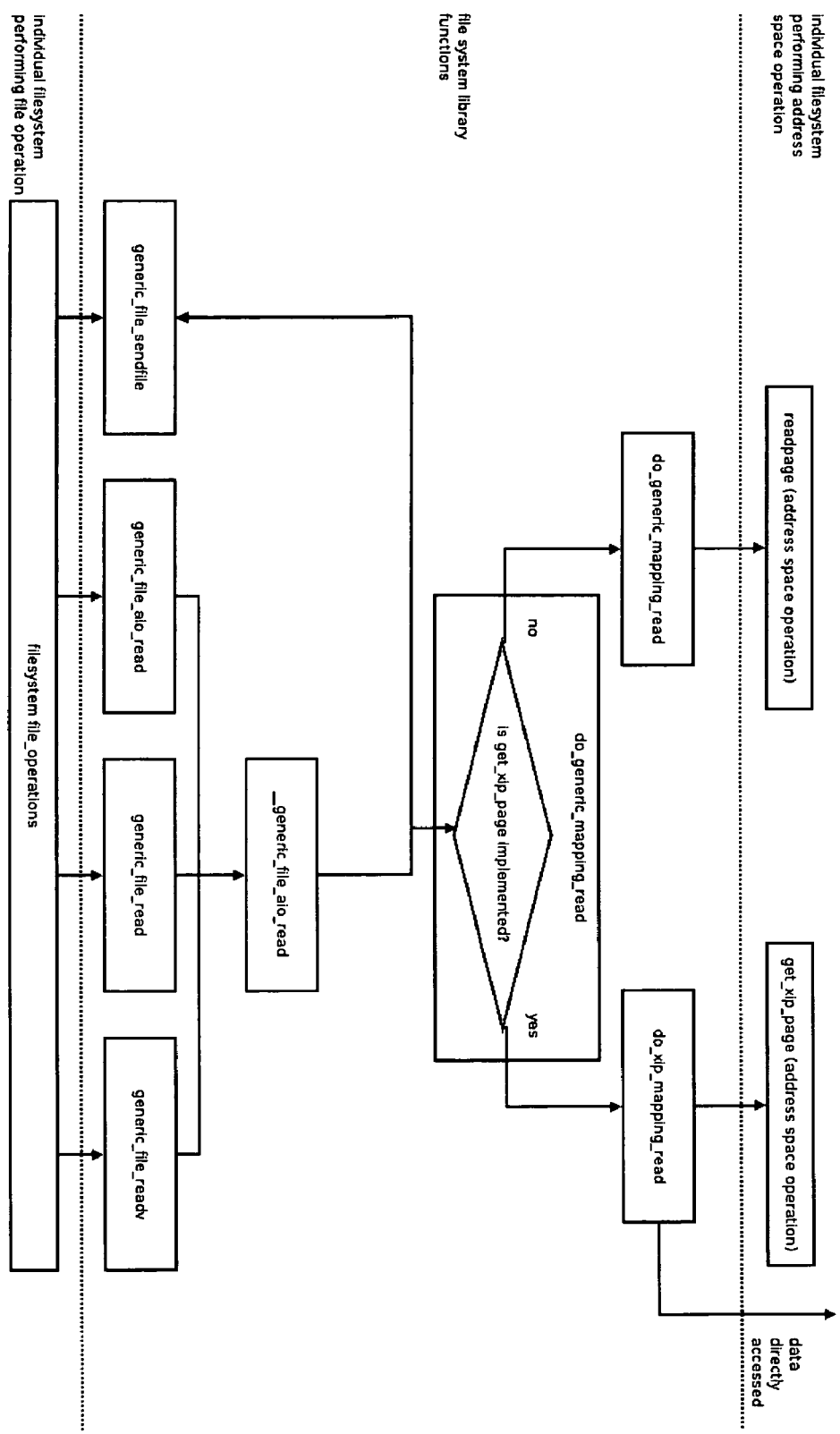
FIG. 3F shows the extension done to the file system library functions for read type operations in a Linux operating system implementing the present invention.
Figure 3G:
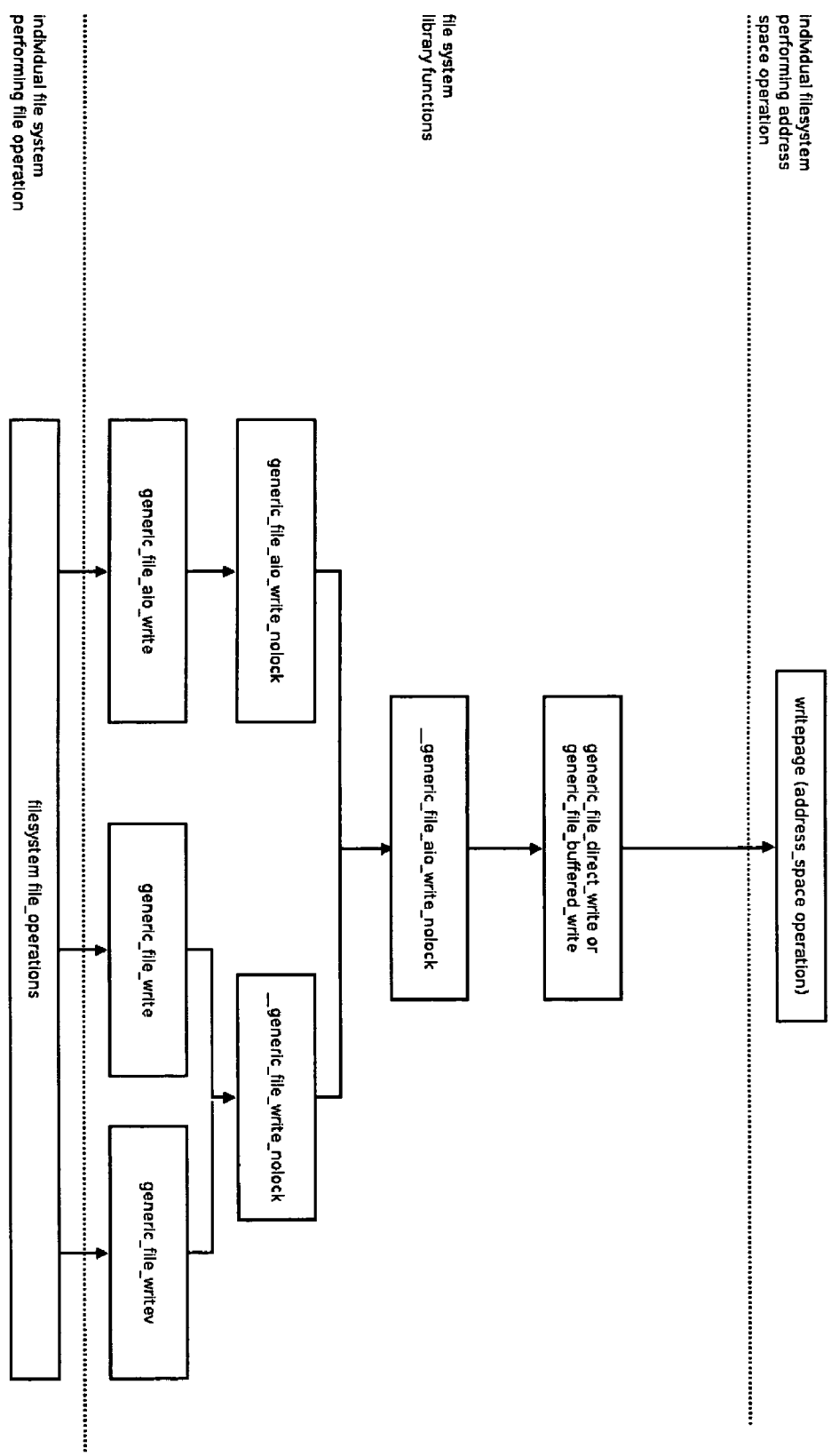
FIG. 3G shows how the file system library functions perform write type file operations for a general purpose file system in a prior art Linux operating system.

FIG. 3G illustrates how the file system library functions perform write type file operations for a general purpose file system in Linux.

The generic_file_write function performs the file operation associated with the sys_write( ) system call.

The generic_file_writev function performs the file operation associated with the sys_writev( ) system call.

The generic_file_aio_write function performs write operations associated with asynchronous IO system calls.

All these functions indirectly call generic_file_direct_write (when the option O_DIRECT was used to open the subject file) or generic_file_buffered_write. Both functions use the writepage(s) functions to write one or multiple page(s) to the device.

Figure 3H:
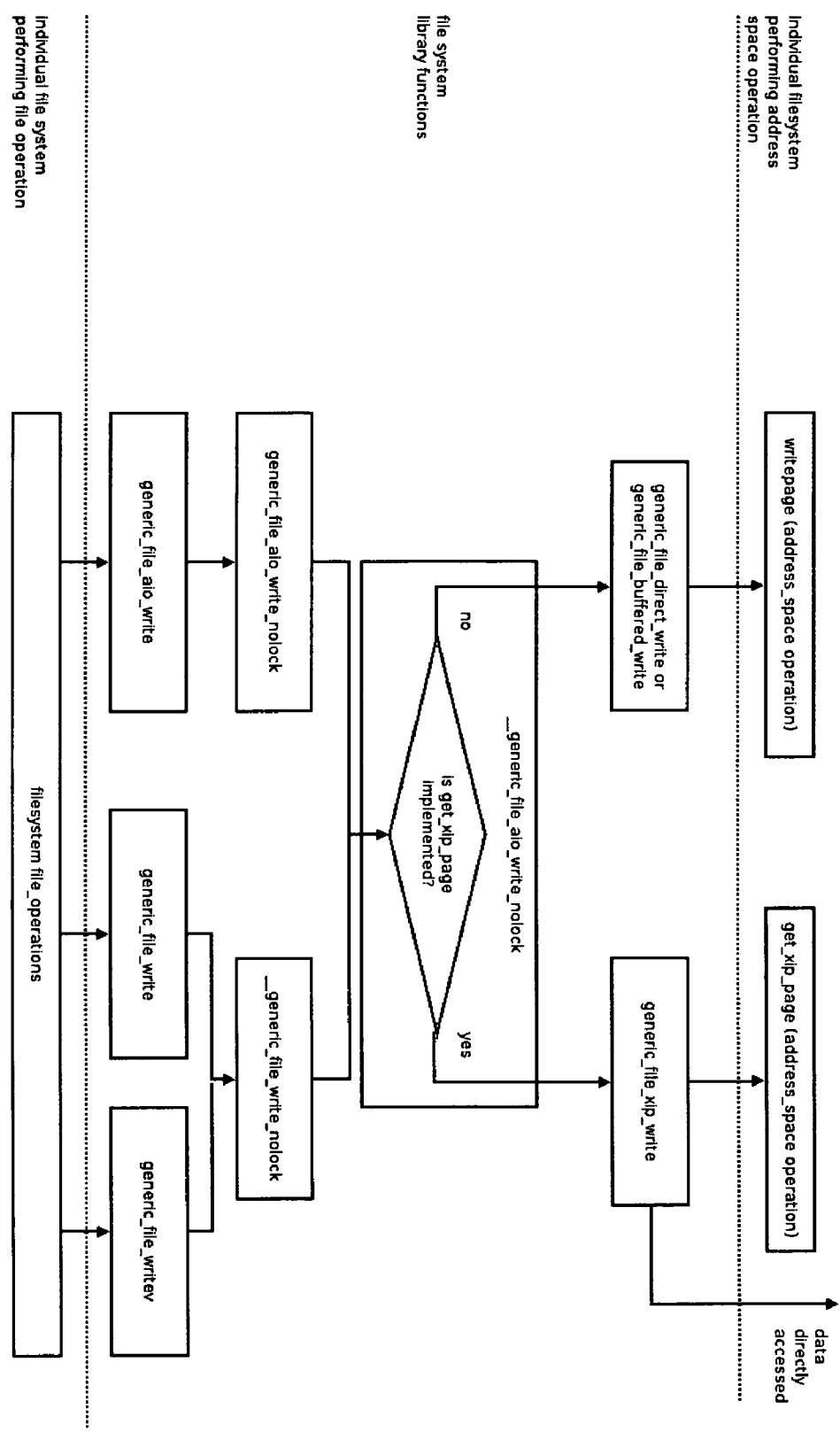
FIG. 3H shows the extension done to the file system library functions for write type operations in a Linux operating system implementing the present invention.

The present invention provides extensions to the library functions to enable them to use the get_xip_page interface when supported. FIG. 3F illustrates the extension done to the file system library functions for read type operations. Depending on whether the get_xip_page address space operation is present, either the generic_mapping_read function or the new do_xip_mapping_read function are used to perform the operation. The do_xip_mapping read function uses the get_xip_page address space operation to retrieve a reference to the subject data on the device. For data transfer, this reference is used directly without performing I/O operations. FIG. 3H illustrates the extension done to the file system library functions for write type operations. Depending on whether the get_xip_page address space operation is present, either the generic_file_buffered_write/generic_file_direct_write functions are used or the new generic_file_xip_write function is used to perform the operation. The generic_file_xip_write function uses the get_xip_page address space operation to retrieve a reference to the subject data on the device. For data transfer, this reference is used directly without performing I/O operations.

Figure 3I:
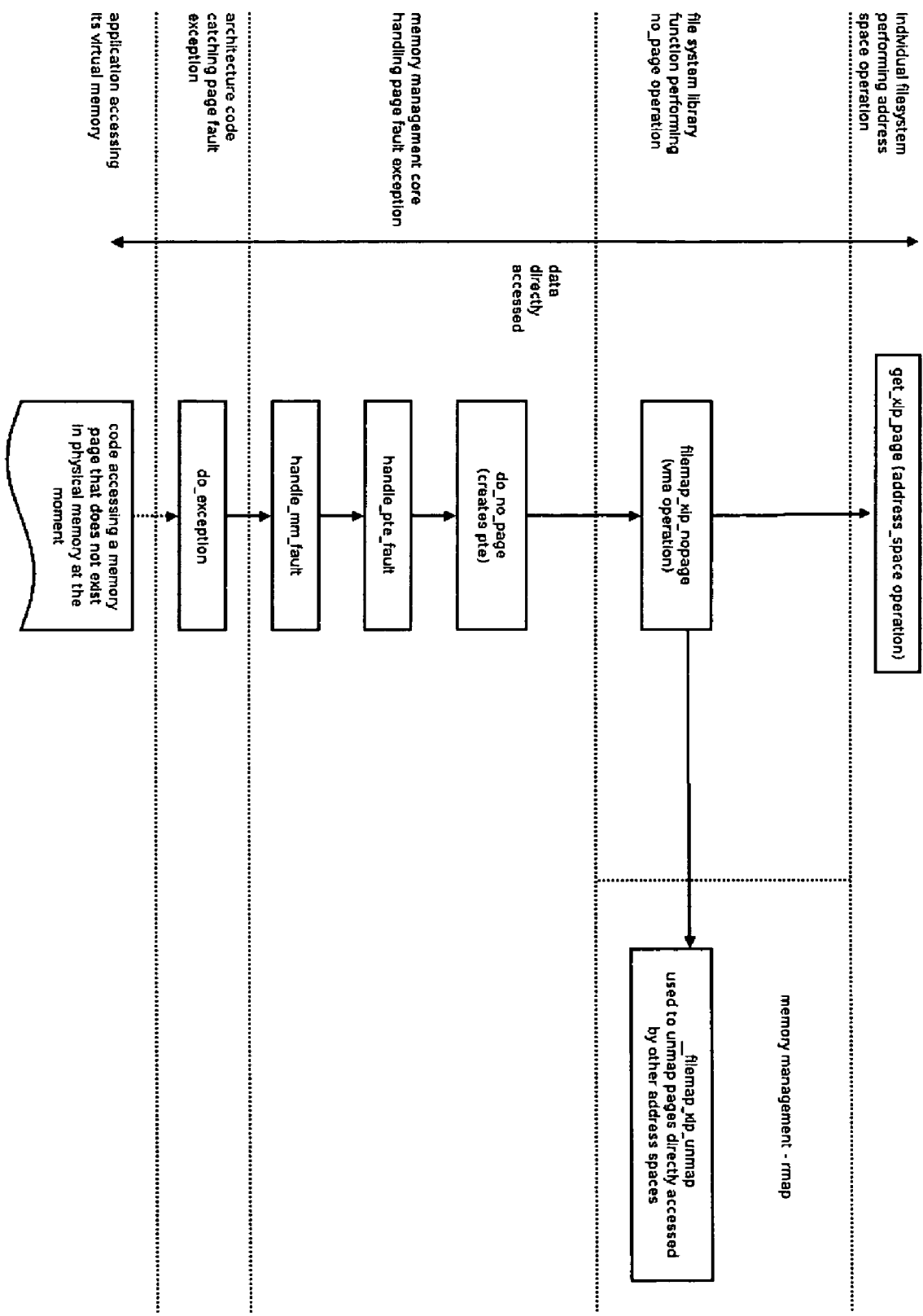
FIG. 3I shows the extension done to the file system library functions for file memory mappings in a Linux operating system implementing the present invention.

All file systems that implement the get_xip_page address space operation need no further code changes to perform execute-in-place accesses with all file operations implemented by the library functions. FIGS. 3F, 3H, and 3I illustrate how the extended library functions implement their functionality depending on whether the get_xip_page address space operation is implemented. When get_xip_page is implemented, all library functions perform all data transfers directly to the storage device using the reference retrieved from get_xip_page. FIG. 3I illustrates the extension done to the file system library functions for file memory mappings. The application has accessed a part of its virtual memory address space which is currently not present. The standard architecture-dependent and core memory management functions of Linux are used to handle the resulting page fault. Different from regular processing, the file system has installed the filemap_xip_nopage hander for the file associated with the subject page. This handler uses get_xip_page to retrieve a reference to the subject data on the device. This reference is returned to the do_no_page function which creates a page table entry in the application's virtual address space page table to allow the application to use the data on the device directly without further involvement of the operating system. The page table entry may be subject to the copy on write mechanism later on when the file mapping was selected to be private (standard mechanism applies).

The execute-in-place effect is achieved because application binary files and shared libraries are subject to file mapping in Linux and therefore are subject to above page fault mechanism.

Above extensions keep the entire structure and layer isolation within the I/O-related components of the Linux operating system intact: The device driver layer maps physical block numbers to the device, but does not work with files or other logical objects. The file system performs the mapping between logical file and physical block number addressing, but does not work with the inner structure of the device. On the other hand, the data transfer itself is turned upside down: The device driver does not transfer any data when the new extensions are used. The data is transferred directly in the file operations library functions. The advantages of this solution include very little and only non-intrusive changes to the device driver layer, and general purpose file systems. Any general purpose file system can easily get the benefits of the execute-in-place mechanism like reduced memory consumption and increased performance.

The invention claimed is:

1. A method for automatically providing an execute-in-place functionality by a system, wherein said system accepts a request for accessing a file by an application program and decides whether or nor to use the execute-in-place functionality for accessing said file, wherein said method comprises the steps of:

identifying a file system holding said file;

determining whether a file system driver managing said file system provides a file system direct-access interface;

in response to determining that said file system driver provides said file system direct-access interface:

using execute-in-place functionality to access said file; and identifying a device on which said file system resides;

determining whether a device driver managing said device provides a device direct-access interface;

using execute-in-place functionality to access said file in response to determining that said device driver provides said device direct-access interface;

determining whether said file system is configured to enable execute-in-place functionality; and using said file system direct-access interface to provide said execute-in-place functionality in response to determining that said file system is configured to enable execute-in-place functionality.

2. A computer program product stored in the internal memory of a digital computer, containing parts of software code to execute the method in accordance with claim 1 if the product is run on the computer.

* * * * *